(12) United States Patent
Naslund et al.

(10) Patent No.: US 7,331,488 B2
(45) Date of Patent: Feb. 19, 2008

(54) MULTI-CHEMICAL DISPENSING SYSTEM

(75) Inventors: Paul E. Naslund, St. Louis, MO (US); James Schuleter, Dardenne Prairie, MO (US)

(73) Assignee: Dema Engineering Company, St. Louis, MO (US)

( * ) Notice: Subject to any disclaimer, the term of this patent is extended or adjusted under 35 U.S.C. 154(b) by 493 days.

(21) Appl. No.: 10/988,864

(22) Filed: Nov. 15, 2004

(65) Prior Publication Data

US 2006/0102657 A1 May 18, 2006

(51) Int. Cl.
*B67D 5/60* (2006.01)

(52) U.S. Cl. ............... 222/144; 222/144.5; 222/145.1; 222/145.6; 251/65; 137/602; 137/888; 137/894; 239/414; 134/99.2; 134/100.1

(58) Field of Classification Search ........ 222/144, 222/144.5, 145.1, 145.4–145.8, 132; 251/65; 137/602, 888, 889, 892–898, 605–607; 239/101, 239/304, 305, 310, 318, 410, 414, 415, 416.1, 239/428

See application file for complete search history.

(56) References Cited

U.S. PATENT DOCUMENTS

| | | | |
|---|---|---|---|
| 2,176,682 A | 10/1939 | Pedrick | |
| 2,254,421 A | 9/1941 | Eickmeyer et al. | |
| 3,118,610 A | 1/1964 | Techler | |
| 3,604,445 A * | 9/1971 | Jordan et al. | 137/113 |
| 3,610,535 A | 10/1971 | Bradshaw | |
| 3,810,787 A | 5/1974 | Yoeli et al. | |
| 4,029,260 A | 6/1977 | Herrick | |
| 4,505,431 A | 3/1985 | Huffman | |
| 5,060,866 A | 10/1991 | Carlzon | |
| 5,069,245 A | 12/1991 | Potter | |
| 5,228,598 A | 7/1993 | Bally et al. | |
| 5,351,875 A | 10/1994 | Rhine et al. | |
| 5,653,261 A | 8/1997 | Dalhart et al. | |
| 5,693,226 A | 12/1997 | Kool | |
| 6,283,385 B1 | 9/2001 | Beaver et al. | |
| 6,299,035 B1 | 10/2001 | Dalhart | |
| RE37,617 E | 4/2002 | Sherman | |
| 6,571,805 B2 | 6/2003 | Hoenisch et al. | |
| 6,607,174 B2 | 8/2003 | Weber et al. | |
| 6,655,401 B2 | 12/2003 | Sand et al. | |

OTHER PUBLICATIONS

Product brochure, SEKO, KLYN Spray System.
Product brochure, Hydronova Europe, "The World's Best Cleaning and Sanitising System?", Hydro Nova Europe Limited, England, 2 pgs.
Product brochure, DOSATRON, Venturi Hygiene Unit, PHV, 2 pgs.

* cited by examiner

*Primary Examiner*—J. Casimer Jacyna
(74) *Attorney, Agent, or Firm*—Husch & Eppenberger LLC; H. Frederick Rusche

(57) ABSTRACT

An apparatus for selective eductive dispensing of multiple chemical fluids from separate fluid containers includes a motive fluid inlet; an eductor in fluid communication with said motive fluid inlet; a selector switch defining at least one inlet and an outlet therein, said inlet and outlet in fluid communication with one another and said outlet in fluid communication with said eductor and wherein said selector switch inlet is in selective fluid communication with said fluid containers depending on the position of the selector switch; and a valve located between said motive fluid inlet and said eductor, said valve selectively opened and closed by movement of said selector switch.

23 Claims, 4 Drawing Sheets

MULTI-CHEMICAL DISPENSING SYSTEM

TECHNICAL FIELD OF THE INVENTION

The present invention relates generally to eductive flow control systems and, more particularly, to a selection and flow control mechanism for an eductive dispensing system.

BACKGROUND OF THE INVENTION

Eductive dispensing systems designed to dispense multiple chemicals from a common outlet are generally known in the art. These systems generally utilize a centralized control box that is connected to a supply of eductive fluid, which is usually water, a supply of at least two chemicals from which the system can select, and an outlet, for example, a hose connected to a spray wand or nozzle, to dispense the desired mixture. These systems require mechanisms to (1) turn the flow of the eductive fluid on and off, which controls the operation of the entire system and (2) select the particular chemical to be dispensed with the eductive fluid. Prior art systems utilize two separate mechanisms to accomplish these tasks. In addition, the prior art systems generally utilize distinct chemical paths, with a separate eductor for each chemical path, for each chemical connected to the system. This design renders the eductor units in accessible for removal and cleaning or replacement.

U.S. Pat. No. 6,655,401 describes a multiple chemical eductive dispensing system that utilizes a separate selection control and eductive fluid inlet valve. The selection control includes separate eductors, also known as venturis, for each chemical path. This reference does refer to the possibility of turning the flow of all fluid off via the selector switch of the system, but does not describe how this may be done.

The prior art systems also lack a means for preventing the potential contamination of the individual chemical storage containers with the water/chemical mixture when flow of the mixture is shut off at the spray nozzle. When the flow of water/chemical mixture is shut of at the spray nozzle, pressure in the portion of the system below the eductor rises. If the pressure in this system reaches a level greater than the chemical inlet pressure at the eductor, then it is possible for the water/chemical mixture to overcome the inlet pressure and flow back into the chemical supply line. This contamination can result in overly diluted, and, therefore, ineffective, chemical being dispensed from the system.

The present invention is directed to overcoming one or more of the problems set forth above.

SUMMARY OF THE INVENTION

An aspect of the present invention is to provide a control mechanism for a multi-chemical eductive dispensing system capable of controlling both the flow of eductive fluid and selection of a desired chemical in a single selector means.

Another aspect of the invention is to provide a control mechanism for a multi-chemical eductive dispensing system that provides ready access to a single eductor unit for ease of maintenance and/or replacement.

Yet another aspect of the invention is to provide a control mechanism for a multi-chemical eductive dispensing system that prevents back flow of the eductive fluid/chemical mixture into the chemical supply system.

In accordance with the above aspects of the invention, there is provided an apparatus for selective eductive dispensing of multiple chemical fluids from separate fluid containers including a motive fluid inlet; an eductor in fluid communication with said motive fluid inlet; a selector switch defining at least one inlet and an outlet therein, said inlet and outlet in fluid communication with one another and said outlet in fluid communication with said eductor and wherein said selector switch inlet is in selective fluid communication with said fluid containers depending on the position of the selector switch; and a valve located between said motive fluid inlet and said eductor, said valve selectively opened and closed by movement of said selector switch.

In accordance with another aspect of the invention, there is provided an apparatus for selective eductive dispensing of multiple chemical fluids from separate fluid containers that includes a motive fluid inlet; an eductor in fluid communication with said motive fluid inlet; a selector switch defining at least one inlet and an outlet therein, said inlet and outlet in fluid communication with one another and said outlet in fluid communication with said eductor, said inlet in selective fluid communication with said fluid containers; and a pressure sensitive valve located between said eductor and said outlet in said selector switch, said pressure sensitive valve disrupting fluid communication between said eductor and said selector switch outlet when the pressure on the eductor side of the pressure sensitive valve rises above that on the selector switch side of said valve.

In accordance with yet another aspect of the invention, there is provided an apparatus for selective eductive dispensing of multiple chemical fluids from separate fluid containers including a motive fluid inlet; a single eductor in fluid communication with said motive fluid inlet; an outlet, wherein said single eductor is located proximate said outlet; a selector switch defining at least one inlet and an outlet therein, said inlet and outlet in fluid communication with one another and said outlet in fluid communication with said single eductor and said inlet in selective fluid communication with said fluid containers; and wherein flow of each of said multiple chemical fluids passes through said single eductor regardless of which chemical is selected and said single eductor is removable from said apparatus through said outlet.

These aspects are merely illustrative of the various aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made to the drawings which illustrate the best known mode of carrying out the invention and wherein the same reference numerals indicate the same or similar parts throughout the several views.

DETAILED DESCRIPTION

Figure 1:
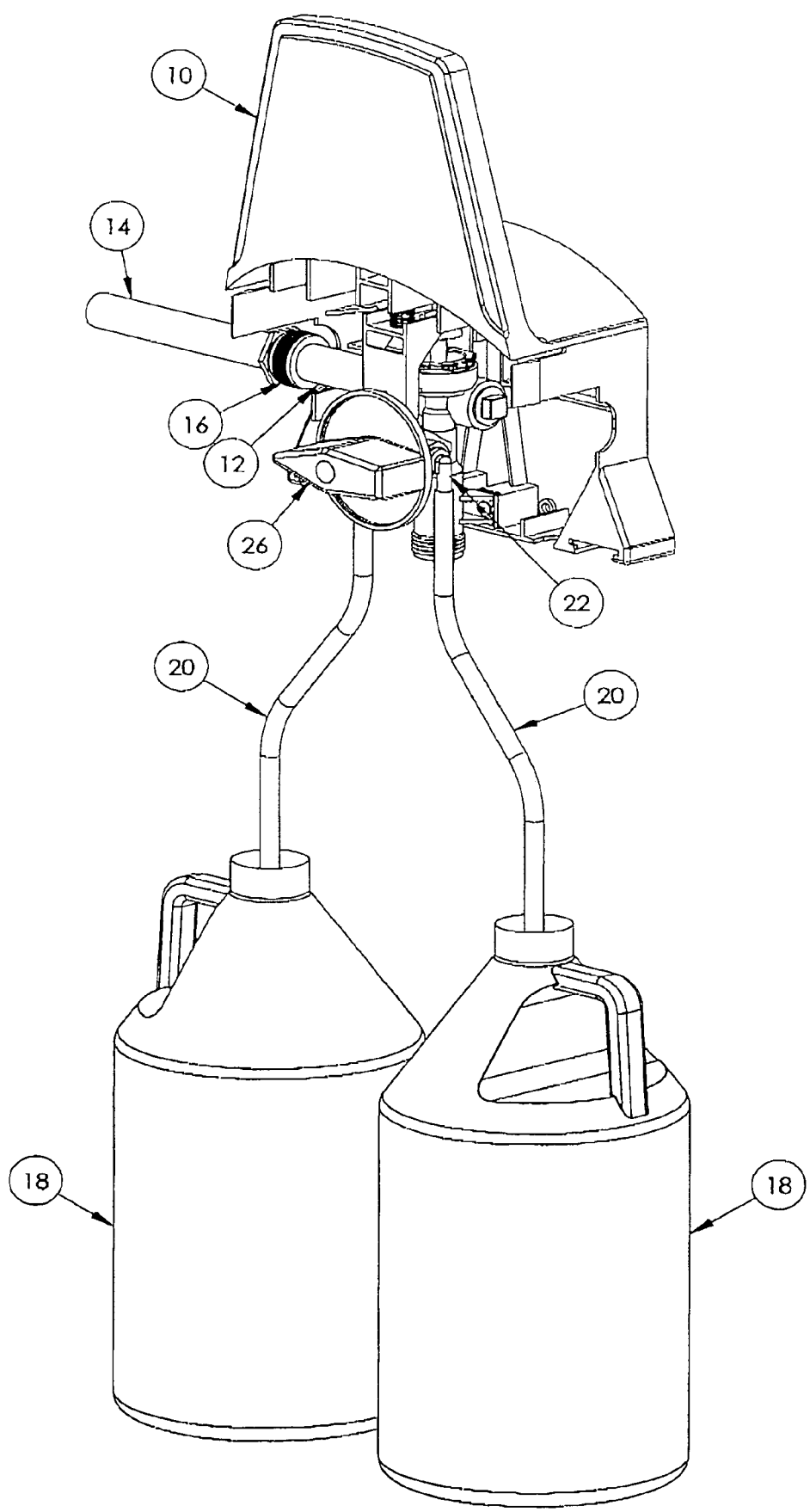
FIG. 1 is a partial view of a multi-chemical dispensing system according to an embodiment of the present invention with a portion of the system cover removed to show the components of the system.

In the following detailed description, numerous specific details are set forth in order to provide a thorough understanding of the invention. However, it will be understood by those skilled in the art that the present invention may be practiced without these specific details. For example, well-known methods, procedures, and components have not been described in detail so as not to obscure the present invention.

FIGS. 1-4 illustrate a preferred embodiment of a control mechanism for a multi-chemical eductive dispensing system. The mechanism is contained within a housing 10 that protects the mechanism and provides a commercially preferable visual appearance. A motive fluid inlet 12 is provided for connection to a supply line 14. The inlet is provided with a standard hose fitting 16.

The system is also connected with a plurality of chemical fluid containers 18. The containers 18 are connected to the system by supply lines 20. The system is provided with multiple chemical inlets in the form of barbs 22. The number of different chemicals that can be used with the system at one time is limited only by the number of chemical inlet barbs 22 provided in a particular embodiment. However, not all of the barbs 22 need to be utilized at all times.

The system permits selection from among one of the connected chemical fluid containers 18 by means of a selector switch 24. In the illustrated embodiment, the selector switch is rotary switch with a knob 26 extending from the housing 10. The switch is contained within a sleeve 28. The rotary switch is 24 intended to fit snugly within the sleeve 28 while still being able to rotate within the sleeve. The rotary switch 24 contains an open passage 30 running generally along the axis of the rotary switch 24. The passage 30 extends towards the interior end of the rotary switch 24. In the preferred embodiment, the passage 30 is annular and surrounds a central body. At the interior end of the rotary switch 24, the passage 30 narrows into an outlet 32. A number of inlet openings 34 that fluidly connect the exterior of the rotary switch 24 with the passage 30 are arranged along the sides of the rotary switch 24.

A number of outlet openings 36 are arranged around the sleeve 28. The number of outlet openings 36 corresponds to the number of barbs 22 in the system. Each outlet opening 36 is fluidly connected with one barb 22. The connection between the outlet openings 36 and the barbs 22 can be accomplished with molded manifolds that are integral with the housing 10 or tubing or by direct connection of the barbs with the outlet openings, among other possibilities. Those of skill in the art will recognize that multiple means can be utilized for this connection. The precise nature of this connection is not essential to the invention.

The inlet openings 34 of the rotary switch generally correspond to the outlet openings of the sleeve. In the preferred embodiment, a particular inlet opening 34 can be aligned with a particular outlet opening 36 in order to create a fluid passageway from the barb 22, to the outlet 36, through the inlet opening 34, and into the passage 30 by rotating the knob 26, and with it the rotary switch 24. However, the relative position of the inlet openings 34 to one another is purposefully varied from the corresponding positioning of the sleeve outlet openings 36 to one another to ensure that only one inlet 34 and one outlet 36 are aligned at a time. In an alternate embodiment, only a single inlet opening 34 is provided in the rotary switch 24, which is selectively rotated from outlet 36 to outlet 36. In another embodiment, some number of inlets 34 greater than one but less than the number of outlets 36 is used. Those of skill in the art will recognize that a number of different combinations of rotary switch inlets 34 and sleeve outlets 36 can be utilized and will fall within the scope of the invention. While the preferred embodiment contemplates the dispensing of only one chemical at a time, it is within the scope of the invention to arrange the inlets 34 and outlets 36 so that two or more inlet/outlet pairs are aligned in order to dispense desired mixtures of multiple chemicals.

A seal 38 is positioned between the rotary switch 24 and the sleeve 26 to isolate the rotary switch inlets 34 from one another and to prevent fluid leaks.

To enable easier alignment of the desired inlets 34 and outlets 36, the knob 26 is provided with spring-loaded detents 40, which operate in a manner known to those of skill in the art. Each detent 40 is at location along the rotational path of the knob 26 corresponding to the alignment of a particular inlet 34 and outlet 36. The detent 40 holds the knob 26 and rotary switch 24 in place with the desired inlet/outlet alignment. In the preferred embodiment, there is also a detent 40 that corresponds to a position of the rotary switch 24 at which no inlet 34 and outlet 36 are aligned.

The rotary switch 24 controls the flow of chemical to an eductor 42, which is also referred to as a venturi or injector cartridge and is known in the art. The eductor 42 relies on a pressurized supply of motive fluid, which is water in most cases. The motive fluid enters the eductor 42 at the nozzle 44 forming a jet. This action creates a vacuum that draws chemical from the rotary switch outlet 32 into the eductor inlet 46, where the chemical mixes and travels out of the eductor with the motive fluid.

The eductor 42 is supplied with motive fluid from the motive fluid inlet 12. Manifolding or tubing connects the motive fluid inlet 12 with the eductor 42. However, access of motive fluid to the eductor 42 is controlled by a shut off valve 48. In the preferred embodiment, the shut off valve 48 utilizes a design disclosed in U.S. Pat. No. 6,607,174, which is commonly owned by the assignee of the present invention and is incorporated herein by reference. For convenience a brief description of the shut off valve 48 is provided herein The shut-off valve 48 includes a body 50 having a threadedly connected cap 52, an inlet 54 connected between the motive fluid inlet 12 and an inlet chamber 56. The shut-off valve outlet 48 includes a valve seat 60 at its upper end and a valve element 62 which is shown in a closed position. In the embodiment shown, the valve element 62 includes a body 70 having a passage 71 and an annular web 72 having bleed holes 74 and an outer ring 75 and constitutes a diaphragm. The annular web outer ring 75 is clamped in place between the valve body 50, a casing 72 and the valve cap 52.

The valve element 62 is movable from a closed position, preventing flow through the valve seat 60, to an open position, permitting flow through the valve seat 60. Upward movement is resisted by a plunger 80 provided on the other side of the valve element 62. The plunger 80 is enclosed in a casing 82. The casing 82 includes a lower bell-shaped portion 84 having a flange 85, which is held in place between the valve body 50 and the threadedly connected cap 52 and an upper tubular portion 86 having a diameter sufficiently large that the plunger 80 can slide within said upper portion 86 against the resistance of a spring 88 provided at the end of the casing tubular portion 86.

In the valve closed position the valve element 62 is held against upward movement from water pressure in the inlet chamber 56 by water pressure in chamber 73, by the location of the plunger 80 relative to a magnet 90 and by the spring 88, which tends to hold the plunger 80 into the closed position. It will be appreciated that in the closed position, the area of the valve element upper surface in chamber 73 is greater than the area of the valve element lower surface in the inlet chamber 56 resulting in a net closing force due to water pressure on the valve element 62.

The plunger 80 is magnetically attractive and can be moved vertically away from the valve element 62 by upward movement of a permanent magnet 90 carried in a retainer 81 by a carriage 92. The carriage 92 includes a generally vertical member 94, which is movable relative to the housing 10, and an upper transverse member 96, with which the magnet retainer 81 is integrally formed. The generally vertical member 94 is provided with a horizontal protrusion 98 adjacent its lower end. The horizontal protrusion 98 engages an interior surface of the knob 26. Specifically, the protrusion rides along a cammed surface 100 provided on the interior surface of the knob 26 as the knob is rotated. While the protrusion 98, and with it the carriage 92, remains in one place, the cammed surface 100 presents higher or lower horizontal surface on which the protrusion 98 rests as the knob 26 is rotated. The changing height of the cammed surface 100 thereby raises and lowers the protrusion 98 and the carriage 92. A spring 102 inserted between the housing 10 and the top surface of the carriage 92 biases the carriage 92 downward, thereby keeping the protrusion 98 in contact with the cammed surface.

Advantageously, the cammed surface 100 is arranged such that higher horizontal surfaces engage the protrusion 98, thereby raising the carriage 92 and opening the shut off valve 48, in those knob positions in which the rotary switch aligns an inlet 34 and an outlet 36. This simultaneously permits the flow of motive fluid to the eductor 42 and opens a passage for the selected chemical fluid to flow to the eductor 42. The lower horizontal surfaces of the cammed surface are arranged to engage the protrusion, thereby allowing the carriage to be forced downward by the spring 102 and closing the shut off valve 48, in knob positions in which no inlet 34 and outlet 36 are aligned. In the preferred embodiment, there is another knob position in which the higher horizontal surfaces of the of the cammed surface 100 engage the protrusion 98 of the carriage 92, thereby opening the shut off valve, while no inlet 34 and outlet 36 are aligned. This permits dispensing of motive fluid only as a rinse cycle.

Positioned between the rotary switch outlet 32 and the eductor inlet 46 is a pressure sensitive valve 104 which acts as a check valve. In a preferred embodiment, the pressure sensitive valve 104 is an umbrella valve having a sealing diaphragm 106 and a stem 108. The stem 108 secures the valve to a perforated surface 110 between the rotary switch outlet 32 and the eductor inlet 46. The perforated surface 110 may be integral with the sleeve 28 or may be a separate piece that is inserted into the sleeve 28.

Figure 2:
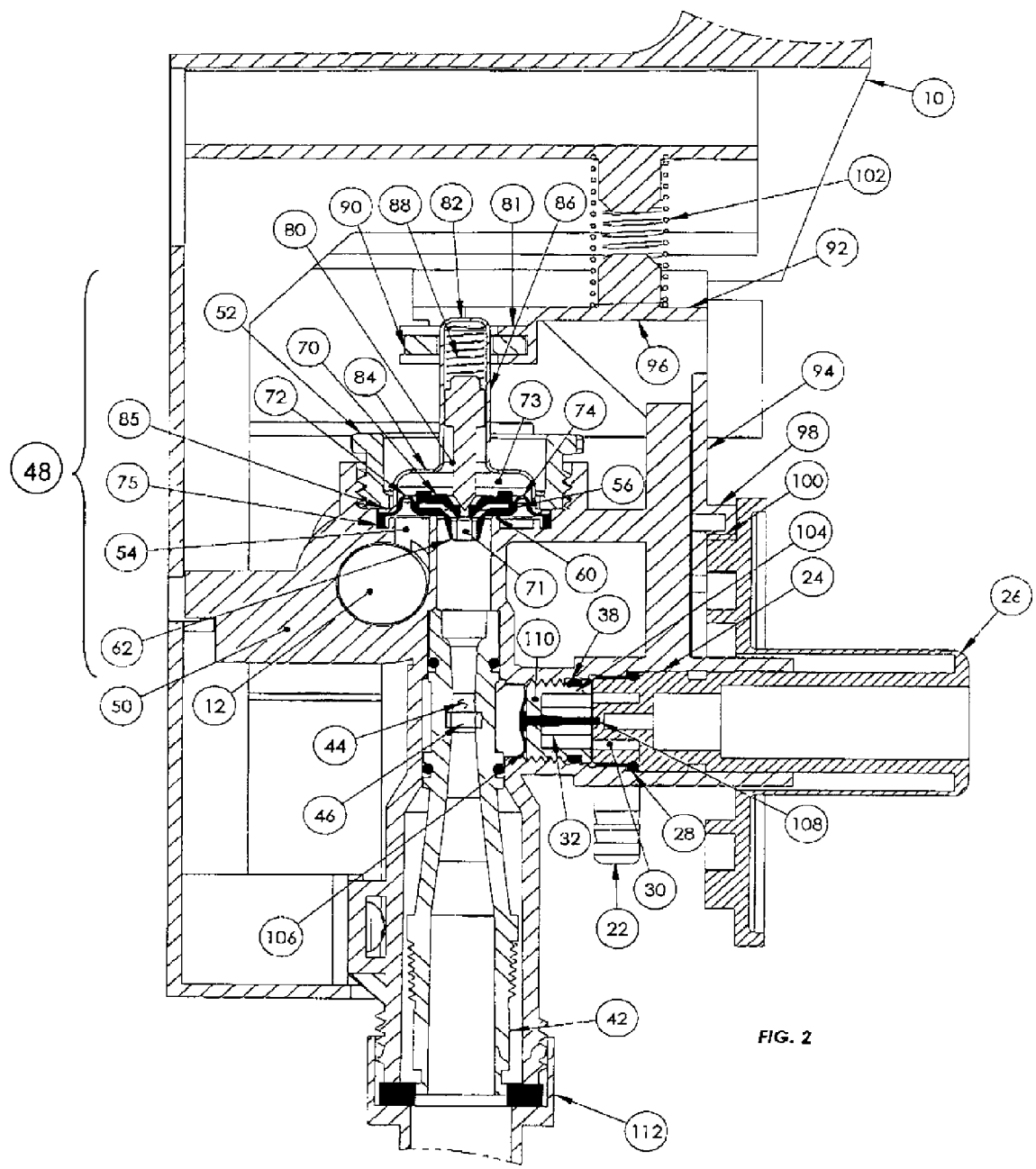
FIG. 2 is a section view of a multi-chemical dispensing system showing the internal features of the system.
Figure 3:
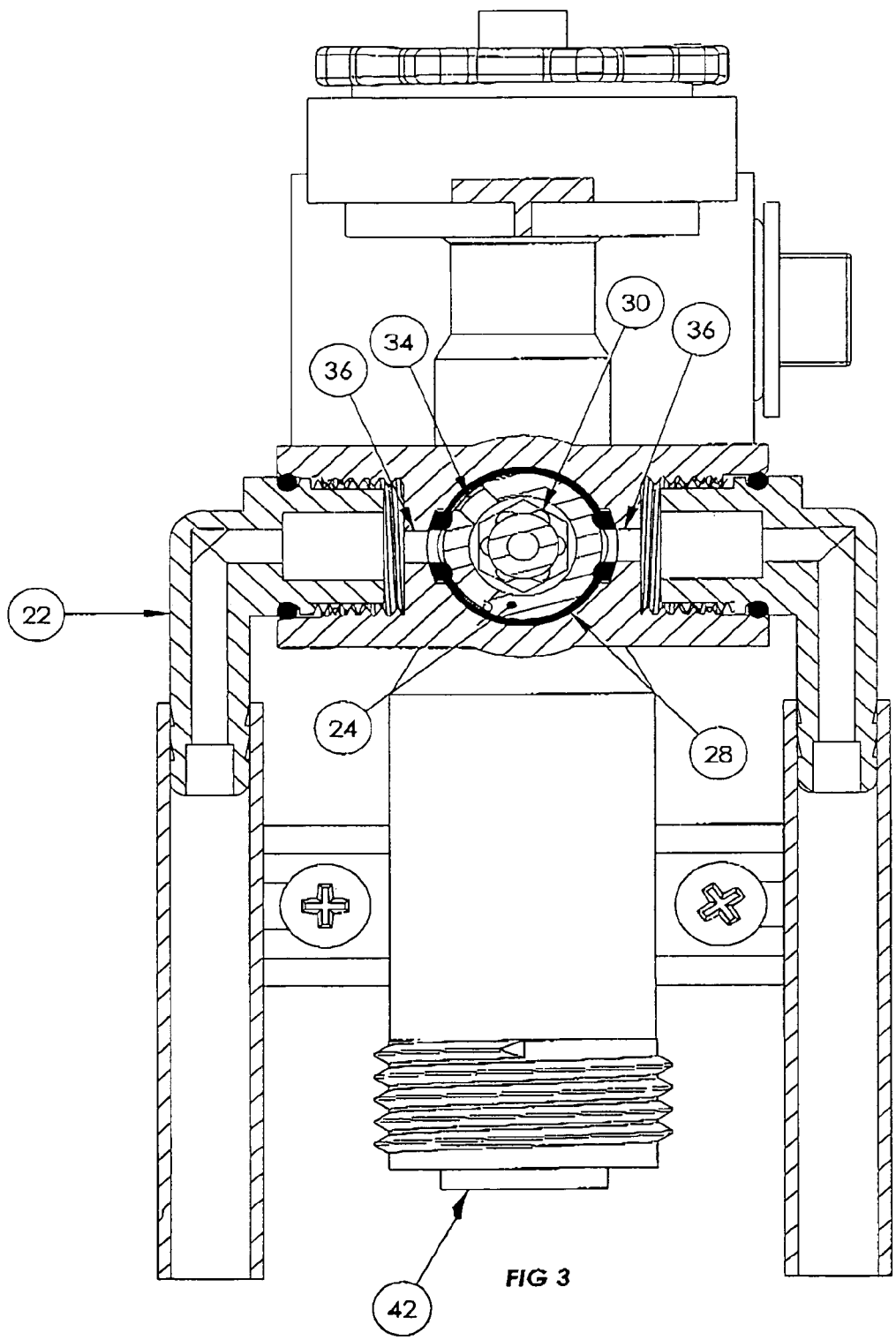
FIG. 3 is partial section view of a multi-chemical dispensing system from the front of the system.
Figure 4:
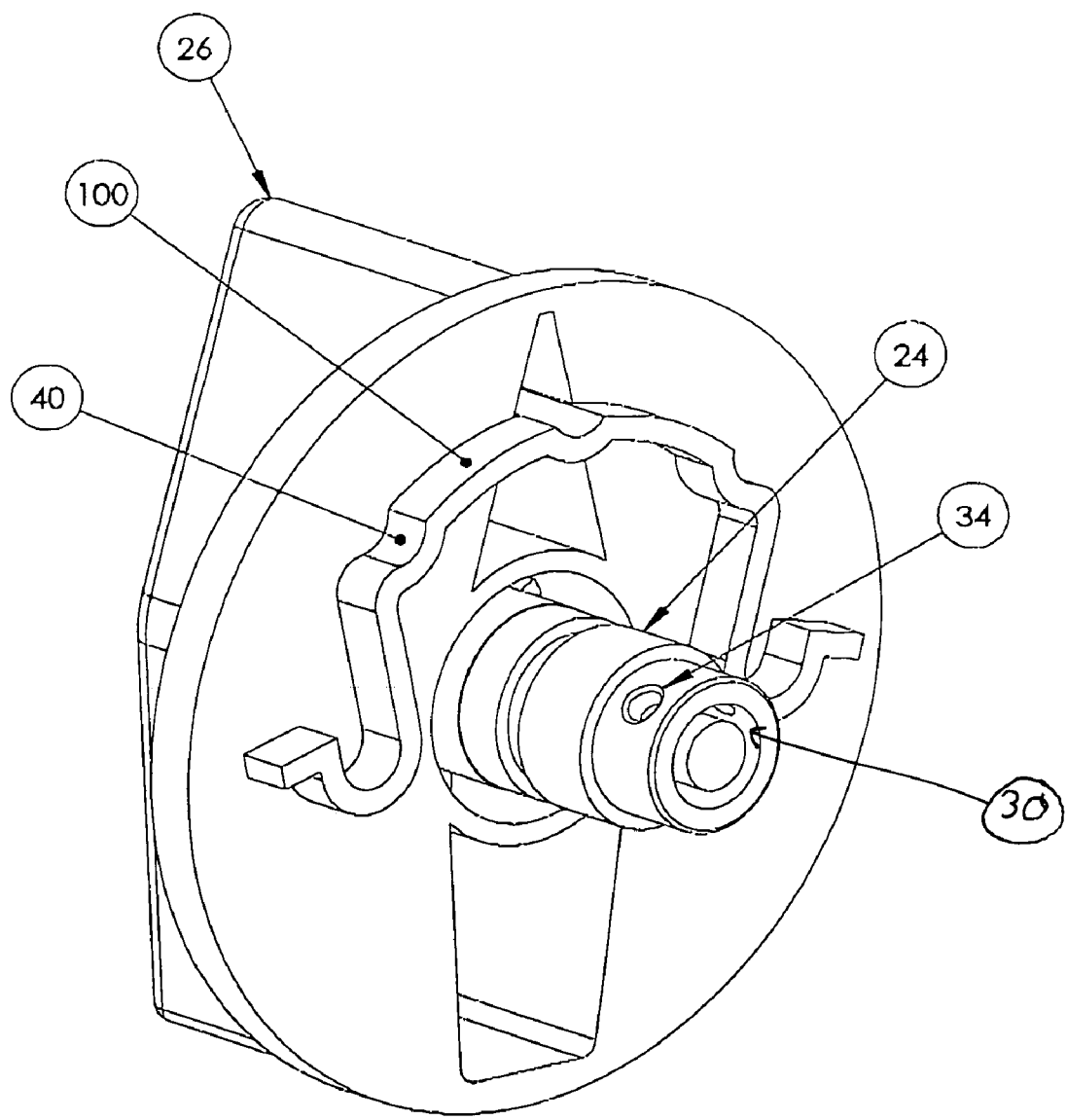
FIG. 4 is a perspective view of the rear surfaces of a selector switch for use with a multi-chemical dispensing system.

As illustrated in FIGS. 2 and 3, the eductor 42 is advantageously arranged in the outlet of the system at the bottom of the unit or another convenient access opening in the housing 10. The eductor 42 is largely secured in place by hose fitting 112. The eductor 42 may be quickly and easily removed by removing the hose fitting and pulling the eductor 42 out of the housing 10. This arrangement allows easy removal and cleaning or replacement of the eductor 42. In the preferred embodiment, the eductor 42 is an injector cartridge that can be removed in its entirety from the system.

Other objects, features and advantages of the present invention will be apparent to those skilled in the art. While preferred embodiments of the present invention have been illustrated and described, this has been by way of illustration and the invention should not be limited except as required by the scope of the appended claims and their equivalents.

What is claimed is:

1. An apparatus for selective eductive dispensing of multiple chemical fluids from separate fluid containers, comprising:
    a motive fluid inlet;
    an eductor in fluid communication with said motive fluid inlet;
    a selector switch defining at least one inlet and an outlet therein, said inlet and outlet in fluid communication with one another and said outlet in fluid communication with said eductor and wherein said selector switch inlet is in selective fluid communication with said fluid containers depending on the position of the selector switch; and
    a valve located between said motive fluid inlet and said eductor, said valve operatively connected with said selector switch and selectively opened and closed by movement of said selector switch.

2. The apparatus for selective eductive dispensing of multiple chemical fluids as set forth in claim 1, further comprising a sleeve enclosing at least a portion of said selector switch, said sleeve defining a plurality of passages therein, each of said passages in fluid communication with one of said fluid containers, and wherein said selector switch is selectively moved to align said selector switch inlet with one of said sleeve passages.

3. The apparatus for selective eductive dispensing of multiple chemical fluids as set forth in claim 2, wherein said selector switch comprises a rotating body at least partially contained within said sleeve.

4. The apparatus for selective eductive dispensing of multiple chemical fluids as set forth in claim 1, wherein said valve further comprises:
    a valve seat;
    a valve element selectively positioned in said valve seat; and
    a valve element actuation mechanism operatively connected with said selector switch, wherein movement of said selector switch raises said valve element actuation mechanism, which, in turn, raises said valve element from said valve seat.

5. The apparatus for selective eductive dispensing of multiple chemical fluids as set forth in claim 4, wherein said selector switch is a rotating body and further comprises a cammed surface and said valve element actuation mechanism is operatively engaged with said cammed surface and wherein rotation of said cammed surface due to movement of said selector switch selectively raises and lowers said valve element actuation mechanism.

6. The apparatus for selective eductive dispensing of multiple chemical fluids as set forth in claim 5, further comprising a first spring operatively connected with said valve element actuation mechanism that biases the valve element actuation mechanism downward and opposes the action of said cammed surface.

7. The apparatus for selective eductive dispensing of multiple chemical fluids as set forth in claim 4, wherein said valve element comprises a diaphragm defining a passage therein and said valve element actuation mechanism further comprises a plunger generally aligned with said passage and wherein movement of said selector switch selectively raises and lowers said plunger relative to said passage of said valve element.

8. The apparatus for selective eductive dispensing of multiple chemical fluids as set forth in claim 7, wherein said valve seal control mechanism further comprises:
- a carriage operatively connected with said selector switch, wherein movement of said selector switch selectively raises and lowers said carriage relative to said valve seat; and
- a magnet connected to said carriage, wherein said magnet attracts, and thereby controls, said plunger, wherein said plunger is raised and lowered with said carriage and said magnet.

9. The apparatus for selective eductive dispensing of multiple chemical fluids as set forth in claim 8, further comprising a plunger spring operatively connected with said plunger and biasing said plunger towards said valve seat.

10. The apparatus for selective eductive dispensing of multiple chemical fluids as set forth in claim 8, wherein said selector switch further comprises a cammed surface and said carriage interacts with said cammed surface and wherein rotation of said cammed surface due to movement of said selector switch selectively raises and lowers said carriage and further comprising a first spring operatively connected with said carriage that biases the carriage and opposes the action of said cammed surface.

11. The apparatus for selective eductive dispensing of multiple chemical fluids as set forth in claim 4, wherein said valve element is a diaphragm.

12. The apparatus for selective eductive dispensing of multiple chemical fluids as set forth in claim 1, wherein said selector switch further comprises a pressure sensitive valve located between said eductor and said outlet in said selector switch, said pressure sensitive valve disrupting fluid communication between said eductor and said selector switch outlet when the pressure on the eductor side of the pressure sensitive valve rises above that on the selector switch side of said valve.

13. The apparatus for selective eductive dispensing of multiple chemical fluids as set forth in claim 2, wherein the selector switch inlet is aligned with only one sleeve passage in a given position of the selector switch.

14. The apparatus for selective eductive dispensing of multiple chemical fluids as set forth in claim 2, further comprising at least one spring-loaded detent operatively connected with said selector switch and corresponding to at least one position wherein said selector switch is selectively moved to align said selector switch inlet with one of said sleeve passages.

15. An apparatus for selective eductive dispensing of multiple chemical fluids from separate fluid containers, comprising:
- a motive fluid inlet;
- an eductor in fluid communication with said motive fluid inlet;
- a selector switch defining at least one inlet and an outlet therein, said inlet and outlet in fluid communication with one another and said outlet in fluid communication with said eductor, said inlet in selective fluid communication with said fluid containers; and
- said selector switch having a pressure sensitive valve located between said eductor and said outlet in said selector switch, said pressure sensitive valve disrupting fluid communication between said eductor and said selector switch outlet when the pressure on the eductor side of the pressure sensitive valve rises above that on the selector switch side of said valve.

16. The apparatus for selective eductive dispensing of multiple chemical fluids as set forth in claim 15, wherein said pressure sensitive valve comprises a diaphragm.

17. The apparatus for selective eductive dispensing of multiple chemical fluids as set forth in claim 15, wherein said pressure sensitive valve comprises an umbrella valve having a diaphragm sealing surface and stem securing said diaphragm sealing surface.

18. The apparatus for selective eductive dispensing of multiple chemical fluids as set forth in claim 17, further comprising a perforated surface separating said outlet of said selector switch and said eductor and wherein said stem of said umbrella valve is connected with said perforated surface.

19. The apparatus for selective eductive dispensing of multiple chemical fluids as set forth in claim 18, further comprising a housing and wherein said selector switch comprises a rotating body at least partially contained within said housing and wherein said perforated surface is connected with said housing.

20. The apparatus for selective eductive dispensing of multiple chemical fluids as set forth in claim 19, wherein said outlet is defined generally along an axis of said rotating body and wherein said umbrella valve is located generally on said axis.

21. An apparatus for selective eductive dispensing of multiple chemical fluids from separate fluid containers, comprising:
- a housing, said housing defining an access opening;
- a motive fluid inlet;
- a single eductor in fluid communication with said motive fluid inlet, wherein said single eductor is located proximate said access opening;
- a selector switch defining at least one inlet and an outlet therein, said inlet and outlet in fluid communication with one another and said outlet in fluid communication with said single eductor and said inlet in selective fluid communication with said fluid containers;
- a valve located between said motive fluid inlet and said eductor, said valve selectively opened and closed by movement of said selector switch; and
- wherein flow of each of said multiple chemical fluids passes through said single eductor regardless of which chemical is selected and said single eductor is removable from said apparatus through said access opening.

22. The apparatus for selective eductive dispensing of multiple chemical fluids as set forth in claim 21, wherein when said valve is closed, said eductor is not subjected to fluid under pressure.

23. The apparatus for selective eductive dispensing of multiple chemical fluids as set forth in claim 21, wherein said eductor comprises an injector cartridge.

* * * * *

UNITED STATES PATENT AND TRADEMARK OFFICE
CERTIFICATE OF CORRECTION

| | | |
|---|---|---|
| PATENT NO. | : 7,331,488 B2 | Page 1 of 1 |
| APPLICATION NO. | : 10/988864 | |
| DATED | : February 19, 2008 | |
| INVENTOR(S) | : Naslund | |

It is certified that error appears in the above-identified patent and that said Letters Patent is hereby corrected as shown below:

On the Title page, item (75) Inventors: should read as follows:

Paul E. Naslund, St. Louis, MO (US);
    James SCHLUETER, Dardenne Prairie, MO (US)

Signed and Sealed this

Second Day of September, 2008

JON W. DUDAS
*Director of the United States Patent and Trademark Office*